3,049,514
Patented Aug. 14, 1962

3,049,514
ORDERED HYDROXY-TERMINATED TERTIARY-NITROGEN-CONTAINING POLYETHER-BASED URETHANE COMPOSITIONS
Adolfas Damusis, Detroit, Mich., assignor to Wyandotte Chemicals Corporation, Wyandotte, Mich., a corporation of Michigan
No Drawing. Filed Mar. 26, 1959, Ser. No. 802,015
16 Claims. (Cl. 260—77.5)

The present invention relates to novel ordered hydroxy-terminated tertiary-nitrogen-containing polyether-based urethane compositions which are of special utility as bodying agents for urethane coatings, particularly when it is not desired to employ thermoplastic resins for such purpose, and which are especially useful as hydroxy-terminated urethane components for two-component polyurethane coatings or corresponding one package systems which employ as the other, or diisocyanate ingredient, a blocked isocyanate.

It is an object of the present invention to provide novel bodying agents for urethane coatings. It is a further object to provide novel and valuable ordered hydroxy-terminated urethane components for polyurethane coatings systems. A further object is the provision of such compositions which are tertiary-nitrogen-containing polyether-based urethanes. Another object is the provision of such ordered urethane compositions which lend advantageous properties to polyurethane coatings in which they are employed as the hydroxy-terminated component or ingredient. Still another object of the invention is the provision of a process for the production of such ordered urethane compositions sequentially by the reaction of about one mol of polypropyleneether glycol with about two mols of a selected arylene diisocyanate, and reaction of the thus-produced isocyanate-terminated urethane with about two mols of a selected tertiary-nitrogen-containing diol, triol, or tetraol, and the products thereby produced. Other objects of the invention will become apparent hereinafter.

The foregoing and additional objects are accomplished by the provision of ordered urethane compositions (U) of the following idealized formula:

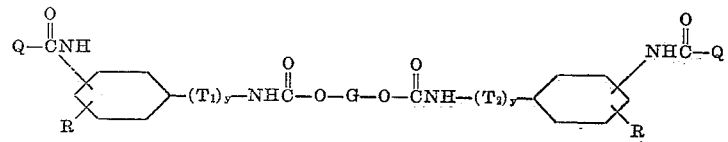

wherein R is selected from hydrogen and methyl, wherein —O—G—O— is the radical of a polypropyleneether glycol (a) having a molecular weight between about 134 and 1000, wherein

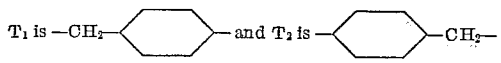

wherein y is selected from zero and one, and wherein Q is the radical of a tertiary-nitrogen-containing polyol (b), said radical Q being the same in both occurrences and being selected from the group consisting of:

(1)
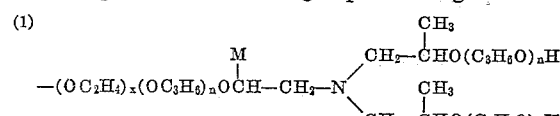

and (2)
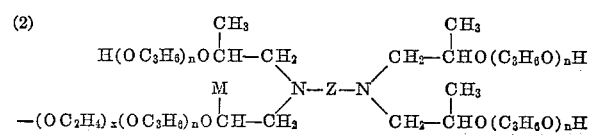

and (3)
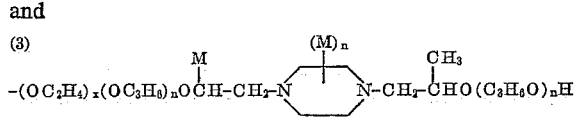

wherein Z is an alkylene radical containing from two through six carbon atoms, wherein M is selected from H and $CH_3$ and may be the same or different in each occurrence, wherein $n$ is a number from zero to four, inclusive, which may be the same or different in each occurrence and wherein $x$ is a number from zero to one, inclusive, said urethane compositions (U) being prepared sequentially by the reaction of about one molar proportion of polypropyleneether glycol (a) with about two molar proportions of arylene diisocyanate (c) selected from the group consisting of phenylene diisocyanate, tolylene diisocyanate, and diphenylmethane-4,4'-diisocyanate, to produce an isocyanate-terminated polypropyleneether glycol urethane (I), and subsequent reaction of the isocyanate-terminated urethane (I) with about two molar proportions of tertiary-nitrogen-containing polyol (b).

Presence of the tertiary amine nitrogen in these ordered urethane compositions is very significant. It acts as a built-in catalyst, speeds up curing of polyurethane coatings embodying these ordered hydroxy-terminated urethanes as one component or ingredient, and affects favorably the properties of polyurethane coatings formed therefrom by reaction with an isocyanate-terminated component or ingredient. Properties favorably affected are surface hardness, film toughness, solvent resistance, and abrasion resistance. Flexibility of such coatings can be readily adjusted by changing the length of the polyoxypropylene chain or chains, either in the starting polypropyleneether glycol or in the tertiary-nitrogen-containing polyol, or both if desired.

These ordered hydroxy-terminated tertiary-nitrogen-containing urethane compositions have certain advantages over ordinary hydroxyl-bearing materials such as polyesters and polyols. Polyurethane coatings prepared therefrom by reaction with an isocyanate-terminated component dry to touch upon evaporation of solvent, and have considerably less sagging tendency than polyurethane coating formulations incorporating regular polyols.

When the ordered hydroxy-terminated urethane compositions of the present invention are reacted with an isocyanate-terminated component, the resulting polyurethane surface coatings are characterized by properties which are superior to those obtained from the same isocyanate component and previously known polyhydroxy components. The same is true when they are employed as one ingredient of a single component surface coating composition together with a blocked isocyanate as the other ingredient (for example, in baking enamels or wire coatings). This is also true for polyurethane surface coatings prepared from the ordered hydroxy-terminated urethane compositions of the invention as opposed to those prepared from random hydroxy-terminated urethane reaction products, compared to which latter a higher solid content at lower viscosity can be attained in surface coatings embodying the ordered hydroxy-terminated urethane compositions of the invention.

The ordered hydroxy-terminated urethane compositions of the present invention are prepared by reacting about one molar proportion of extending polypropyleneether glycol of selected molecular weight between about 134 and 1000 and about two molar proportions of an appropriate arylene diisocyanate selected from phenylene diisocyanate, 2,4-tolylene diisocyanate, 2,6-tolylene diisocyanate, including mixtures of 2,4 and 2,6 tolylene diisocyanates, and diphenylmethane-4,4′diisocyanate, to produce a diisocyanate-terminated urethane having a free NCO group at each end of the molecule. If desired, about one molar proportion of one diisocyanate and about one molar proportion of another diisocyanate may be used. One molar proportion of this isocyanate-terminated urethane adduct is then reacted with about two molar proportions of the selected tertiary-nitrogen-containing polyol to produce an ordered hydroxy-terminated urethane composition in which the terminal hydroxy groups are furnished by the tertiary-nitrogen-containing polyol molecule.

The tertiary-nitrogen-containing polyols used in the final stage of the sequential reaction are selected from the following:

(1) Compounds encompassed by the formula:

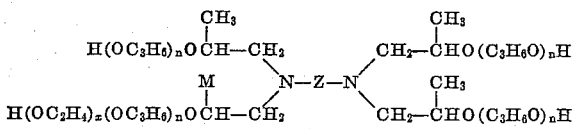

wherein Z is an alkylene radical containing from two through six carbon atoms, wherein M is selected from hydrogen and methyl, and wherein $n$ is a number from zero to four, inclusive, preferably not more than two, and wherein $x$ is a number from zero to one, inclusive, which include, for example, N,N,N′,N′-tetrakis(2-hydroxypropyl)ethylene diamine, N - mono(2-hydroxyethyl)-N,N′,N′-tris(2-hydroxypropyl)ethylene diamine, addition product of one mol of N,N,N′,N′-tetrakis(2-hydroxypropyl)ethylene diamine with one to 16 mols of propylene oxide, addition product of one mol of N,N,N′N′-tetrakis-(2-hydroxypropyl)ethylene diamine with one to three mols of propylene oxide and then with one mol of ethylene oxide, addition product of one mol of N,N,N′,N′-tetrakis(2-hydroxypropyl)ethylene diamine with four to 16 mols of propylene oxide and then with one mol of ethylene oxide, the corresponding higher alkylene diamines, such as N-mono(2-hydroxyethyl)-N,N′,N′-tris-(2-hydroxypropyl)propylene diamine, N,N,N′,N′-tetrakis-(2-hydroxypropyl)propylene diamine, addition products of N,N,N′,N′ - tetrakis(2-hydroxypropyl)propylene diamine with from one to 16 mols of propylene oxide and the monoethylene oxide further addition products thereof, the corresponding tetramethylene and hexamethylene diamines, and the N,N,N′,N′-tetrakis(2-hydroxypropyl)-tetramethylene and hexamethylene diamine mono through hexadeca propylene oxide addition products thereof and such adducts further reacted with one mol of ethylene oxide, and the like. Addition of one mol of ethylene oxide in polyols of types 1, 2, or 3 provides a primary hydroxy group of relatively high reactivity for definite direction and precedence of reaction with NCO groups in preparing the final OH-terminated urethane from the intermediate NCO-terminated urethane.

(2) Compounds encompassed by the formula:

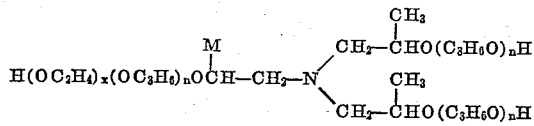

wherein M is selected from hydrogen and methyl, wherein $n$ is a number from zero to four, inclusive, preferably not more than two, and wherein $x$ is a number from zero to one, inclusive, which include, for example, N-mono(ethanol) - N,N - di(isopropanol)amine, triisopropanolamine, triisopropanolamine addition product with one mol of ethylene oxide, triisopropanolamine addition product with from one to 12 mols of propylene oxide, triisopropanolamine addition product with two mols of propylene oxide and one mol of ethylene oxide, and triisopropanolamine addition product with one to 12 mols of propylene oxide and then with one mol of ethylene oxide, and the like.

(3) Compounds encompassed by the formula:

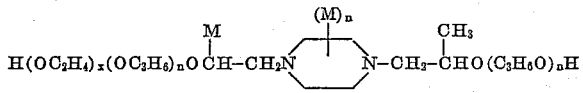

wherein M is selected from hydrogen and methyl and may be the same or different in each occurrence, wherein $n$ is a number from zero to four, inclusive, which may be the same or different in each occurrence, preferably not more than two, and wherein $x$ is a number from zero to one, inclusive, which include, for example, 1,4-bis-(2-hydroxypropyl) - piperazine, 1-(2-hydroxyethyl)-4-(2-hydroxypropyl) - piperazine, 1,4-bis-(2-hydroxypropyl)-methylpiperazine (including dimethyl, trimethyl, and tetramethyl piperazines), 1-(2-hydroxyethyl)-4-(2-hydroxypropyl)-methylpiperazine, addition products of one mol of a 1,4-bis-(2-hydroxypropyl)-methylpiperazine with one mol of ethylene oxide, addition products of 1,4-bis-(2-hydroxypropyl)-piperazine or a 1-4-bis-(2-hydroxypropyl)-methylpiperazine with from one to eight mols of propylene oxide, addition products of 1,4-bis-(2-hydroxypropyl)-piperazine or a 1,4 - bis - (2-hydroxypropyl)-methylpiperazine with from one to eight mols of propylene oxide and then with one mol of ethylene oxide, and the like.

In practice, the molecular weights of the ordered hydroxy-terminated urethane compositions of the invention, prepared in this sequential manner, have been found to be very close to the molecular weight of a composition having an idealized structure, since very little side reaction occurs using predetermined molar proportions and the sequential addition procedure under moderate reaction conditions, viz., initial reaction temperature below about 60° C. and exclusion of moisture. Also, in practice, a chain length of not greater than about 750, and preferably about 300–400, molecular weight has been found most advantageous for the starting polypropyleneether glycol, and a tertiary-amine-nitrogen-containing polyol addition product having no more than about two propylene oxide units added per individual chain of starting polyol is preferred, as in an alkylene diamine-derived polyol. When using a polypropyleneether glycol of minimum molecular weight, it is preferred that the polyol used contain several propylene oxide units per individual chain. As for the isocyanate employed, tolylene diisocyanate, usually a mixture of about 80%/20% of the 2,4 and 2,6 isomers, is preferred for reasons of economy. Other variations in the starting materials to procure variations in the substituents of the ordered hydroxy-terminated urethane compositions may be usefully made to obtain polyurethane surface coatings of varying types and characteristics upon reaction with a selected isocyanate component. For example, lengthening of the polyoxypropylene chains shown in the above formulae results in a polyurethane coating having a longer pot life, greater flexibility, and lower solvent resistance, while shortening of these polyoxypropylene chains have just the opposite effect. The preferred equivalent weight of the hydroxy-terminated urethanes of the present invention is between about 200 and about 400.

The following examples are given to illustrate the present invention but are not to be construed as limiting:

GENERAL PROCEDURE

Hydroxy-terminated urethanes, such as OH-3 of Example 1, are prepared in two stages. The adduct of polypropyleneether glycol and the selected diisocyanate is prepared in the first stage at a ratio of NCO/OH of about 2/1 and contains two free NCO groups. In the second stage, two molar proportions of a diol, triol or tetraol containing tertiary amine nitrogen are added to one molar proportion of the adduct in order to form a hydroxy-terminated intermediate with free OH groups on both ends of the molecule. The addition of two diol molecules to the adduct changes the NCO/OH ratio to 1/1.5; two triols to 1/2.0; two tetraols to 1/2.5. Dilution of the NCO-terminated intermediate at the end of stage 1 may be with any suitable nonreactive surface coating solvent. Many such solvents suitable in general for urethane coatings and components thereof are known in the art, for example, 2-ethoxyethyl acetate, 2-methoxyethyl acetate, 2-butoxyethyl acetate, toluene, xylene, ethyl acetate, butyl acetate, amyl acetate, other similar esters, ketones, chlorinated solvents, nitro-aliphatic solvents, dioxane, and the like. In some instances no solvent is required during any stage of the reaction.

Polyether polyols used in the reaction are preferably stripped of water by azeotropic distillation with toluene. In this manner, the amount of water can be decreased from 0.08–0.15 to 0.02% or even less. A clean, dry, three-necked five-liter flask was used as a reaction vessel, and a nitrogen blanket was maintained over the reactants.

*Example 1*

(OH–3)

| Reactants | Mols | Parts | Weight, percent |
|---|---|---|---|
| Polypropyleneether glycol, M.W. 420 (Pluracol P–410) | 1 | 840 | 21.7 |
| Tolylene diisocyanate (TDI); 80/20; 2,4/2, 6 | 2 | 696 | 18.0 |
| N,N,N',N' - tetrakis(2 - hydroxypropyl) ethylene diamine—(Quadrol) | 2 | 1,168 | 30.3 |
| 2-ethoxyethyl acetate or 2-butoxyethyl acetate | | 580 | 15.0 |
| Xylene | | 580 | 15.0 |
| | | 3,864 | 100.0 |

NOTE.—Ratio of reaction groups: NCO/OH=4/10=1/2.5.

Procedure:

*Stage 1.*—Add to the 5-liter reaction vessel:

Parts
Tolylene diisocyanate _____ 696
Polypropyleneether glycol, N.W. 420—(Pluracol P–410) _____ 840

By gradual addition of the Pluracol P–410, the temperature of the exothermic reaction is maintained below 60° C. If necessary, cooling is applied. The reactants are stirred for 2 hours at 60° C. and then diluted with:

Parts
2-ethoxyethyl acetate or 2-butoxyethyl acetate _____ 150
Xylene _____ 150

*Stage 2.*—Add to the prepared cooled adduct all the Quadrol, blended with solvent:

Parts:
Quadrol _____ 1168
2-ethoxyethyl acetate _____ 430
Xylene _____ 430

Hold the temperature below 40° C. until the exothermic reaction ceases. Then stir the reactants at 70° C. for 3 hours. Measure the viscosity after each hour of heating.

The resulting OH–3 solution was poured into a clean, dry bottle and tightly capped to exclude moisture.

Properties:
    NCO/OH _____ 1/2.5
    Average molecular weight _____ 1,352
    Average equivalent weight _____ 225.5
    Hydroxyl number _____ 249
    Percent hydroxyl _____ 7.56
Properties of OH–3 solution:
    Nonvolatile, percent _____ 70
    Weight per gallon, lb _____ 8.75
    Viscosity at 25° C., cps _____ 4,000–6,000

OH–3 in urethane coatings: Hydroxyl-terminated urethane OH–3 is used as the second component of urethane coatings. The first component consists of an isocyanate-terminated intermediate. Two typical formulations are presented here.

TWO COMPONENT URETHANE COATINGS

| Composition | Formulation 1 | Formulation 2 [1] |
|---|---|---|
| Isocyanate-terminated intermediate | [2] NCO–1 | [3] NCO–3 |
| Parts | 140 | 199 |
| Hydroxyl-terminated intermediate | OH–3 | OH–3 |
| Parts | 100 | 100 |
| NCO/OH | 1.2/1.0 | 1.2/1.0 |

[1] Numerous other organic polyisocyanates can be used as well as NCO–1 and NCO–3, such as, for example, tri TDI adduct of trimethylolpropane or hexanetriol, the phenylurethanes of any of the foregoing, TDI, MDI, and the like.
[2] NCO–1 is the NCO-terminated reaction product of three mols of TDI with one mol of TP 440 polyol (propylene oxide addition product of trimethylolpropane having a M.W. of about 410).
[3] NCO–3 is the NCO-terminated reaction product of two mols of NCO–1 with one mol of P 410 polyol (polypropylene glycol, M.W. about 420).

| Properties | Formulation 1 | Formulation 2 |
|---|---|---|
| Curing time: | | |
|   Dust free, hrs | 0.7 | 0.6. |
|   Dry to touch, hrs | 1.0 | 0.6. |
| Pot life, hrs | 0.75 | 1.2. |
| Sward hardness | 62 | 60. |
| Elongation, percent | 8–14 | 10–20. |
| Tensile strength, psi | 8,000–11,000 | 7,000–10,000. |
| Impact test—Gardner: | | |
|   Direct, inch-lbs | 12–20 | 16–24. |
|   Indirect, inch-lbs | 6–12 | 8–16. |
| Abrasion resistance, mg./1,000 cycles | 10–30 | 20–40. |
| Chemical resistance: | | |
|   20% NaOH | Excellent | Excellent. |
|   20% HNO₃ | do | Do. |
| Solvent resistance, hrs.: | | |
|   Toluene | >4 | >4. |
|   2-Ethoxyethyl acetate | >4 | 4. |
|   Methyl isobutyl ketone | >4 | 3. |
| Water resistance: | | |
|   Immersion 24 hrs. at 25° C | No effect | No effect. |
|   Immersion ½ hr. at 100° C | do | Do. |
| Weatherometer (twin arc) test, 500 hrs | No loss of gloss. | No loss of gloss. |

Explanation: Film hardness of these two coatings is very high at a comparatively good film flexibility. Solvent resistance is better in a more branched formulation (such as 1) than in a less branched formulation (such as 2). Formulation 2 still has a solvent resistance from very good to good. Abrasion resistance is excellent. More highly branched coatings exhibit improved abrasion resistance. Elongation and impact test indicate that the coatings are semi-flexible, not brittle. Tensile strength is very high. Resistance in the weatherometer test is excellent.

*Example 2*

(OH–3A)

| Reactants | Mols | Parts | Weight, Percent |
|---|---|---|---|
| Polypropyleneether glycol, M.W. 1,000 (Pluracol P–1010) | 1 | 2,000 | 36.2 |
| Tolylene diisocyanate (TDI); 80/20; 2/4, 2/6 | 2 | 696 | 12.6 |
| N,N,N',N'-tetrakis (2-hydroxypropyl)-ethylene diamine (Quadrol) | 2 | 1,168 | 21.2 |
| 2-ethoxyethyl acetate | | 828 | 15.0 |
| Xylene | | 828 | 15.0 |
| | | 5,520 | 100.0 |

Procedure: 696 parts of TDI were reacted with 2000 parts of P–1010 at a temperature below 60° C. for at least 2 hrs. The reaction product was diluted with 216 parts of 2-ethoxyethyl acetate and 216 parts xylene.

1168 parts of Quadrol, dissolved in 612 parts of 2- ethoxyethyl acetate and 612 parts of xylene, were then added to the P–1010/TDI adduct and the reactants stirred at 70° C. for 3 hrs.

Properties:
NCO/OH _____ 1/2.5
Average molecular weight_____ 1932
Average equivalent weight _____ 322
Hydroxyl number _____ 174
Percent hydroxyl _____ 5.27
Properties of OH–3A solution:
Nonvolatiles, percent _____ 70
Weight per gallon, lb_____ 8.72
Viscosity at 25° C., cps_____ 3,000–5,000

OH–3A urethane coatings:

| | Formulation | |
|---|---|---|
| | 3 | 4 |
| COMPOSITION | | |
| Isocyanate-terminated intermediate_____ | NCO-1 | NCO-3 |
| Parts_____ | 101 | 162 |
| Hydroxyl-terminated intermediate_____ | OH-3A | OH-3A |
| Parts_____ | 100 | 100 |
| NCO/OH_____ | 1.2/1.0 | 1.2/1.0 |
| PROPERTIES | | |
| Curing time: | | |
| Dust free, hrs_____ | 0.8 | 0.9 |
| Dry to touch, hrs_____ | 1.5 | 1.6 |
| Pot life, hrs_____ | 2.0 | 2.5 |
| Sward hardness_____ | 60-64 | 56-60 |
| Elongation, percent_____ | Up to 60 | Up to 200 |
| Impact test—Gardner: | | |
| Direct, inch-lbs_____ | >30 | >30 |
| Indirect, inch-lbs_____ | 18 | 24 |
| Solvent resistance, hrs.: | | |
| Toluene_____ | 3 | 3 |
| Methyl isobutyl ketone_____ | 1½ | 1 |

Chemical resistance and water immersion resistance are excellent. The OH–3A of Example 2 gives more flexible films with a lower solvent resistance than the OH–3 of Example 1. The hardness of the films is retained at a high level.

*Example 3*

(OH–3B)

| Reactants | Mols | Parts | Weight, Percent |
|---|---|---|---|
| Dipropylene glycol (DPG)_____ | 1 | 268 | 6.8 |
| Tolylene diisocyanate (TDI); 80/20; 2/4, 2/6_____ | 2 | 696 | 17.5 |
| Polyoxypropylene derivative of triisopropanolamine, M.W. 456 (TIPA P-450-T)_____ | 2 | 1,824 | 45.7 |
| 2-ethoxyethyl acetate_____ | | 598 | 15.0 |
| Xylene_____ | | 598 | 15.0 |
| | | 3,984 | 100.0 |

Procedure: 696 parts of TDI were reacted with 268 parts of DPG at a temperature not over 60° C. for at least 2 hrs. The reaction product was then diluted with 156 parts of 2-ethoxyethyl acetate and 156 parts of xylene. 1824 parts of TIPA P–450–T with 442 parts of 2-ethoxyethyl acetate and 442 parts of xylene were added to the DPG/TDI adduct and the reactants were stirred at 70° C. for 3 hrs.

Properties of OH–3B:
NCO/OH _____ 1/2
Average molecular weight _____ 1394
Average equivalent weight _____ 348.5
Hydroxyl number _____ 161
Percent hydroxyl _____ 4.90
Properties of OH–3B solution:
Nonvolatile, percent _____ 70
Weight per gallon, lb_____ 8.86
Viscosity at 25° C., cps_____ 10,000–13,000

Intermediate OH–3B in urethane coatings:

| | Formulation | | |
|---|---|---|---|
| | 5 | 6 | 7 |
| COMPOSITION | | | |
| Isocyanate-terminated intermediate_____ | NCO-1 | NCO-3 | NCO-3 |
| Parts_____ | 52.7 | 83.7 | 140 |
| Hydroxyl-terminated intermediate_____ | OH-3B | OH-3B | OH-3B |
| Parts_____ | 100 | 100 | 100 |
| NCO/OH_____ | 1.2/1 | 1.2/1 | 2/1 |
| PROPERTIES | | | |
| Curing time: | | | |
| Dust free, hrs_____ | 1.0 | 1.0 | 1.0 |
| Dry to touch, hrs_____ | 1.5 | 1.5 | 1.6 |
| Pot life, hrs_____ | 24 | 20 | 24 |
| Sward hardness_____ | 42-54 | 42-52 | 40-52 |
| Elongation, percent_____ | 8 | 9-12 | 60-90 |
| Tensile strength, p.s.i_____ | 4,000-6,000 | 5,000-8,000 | 3,000-5,000 |
| Impact test—Gardner: | | | |
| Direct, inch-lbs_____ | 10-16 | 14-18 | 16-24 |
| Indirect, inch-lbs_____ | 4-8 | 6-12 | 6-12 |
| Abrasion resistance, mg./1,000 cycles_____ | 20 | 10-20 | 28 |
| Solvent resistance: | | | |
| Toluene_____ | >4 | 3 | >4 |
| Methyl isobutyl ketone_____ | 2 | 1.5 | 3 |

Chemical resistance and water immersion resistance are excellent. The coatings prepared from OH-terminated urethane OH–3B of Example 3 exhibit a much longer, more favorable pot-life time, but are not as hard and have less solvent resistance than those prepared from the OH–3 product of Example 1.

*Example 4*

(OH–3X)

| Reactants | Mols | Parts |
|---|---|---|
| Polypropyleneether glycol, M.W. 750_____ | 1 | 1,500 |
| Phenylene diisocyanate_____ | 2 | 624 |
| Mono ethylene oxide addition product of N,N,N',N'-tetrakis (2-hydroxypropyl) propylene diamine__ | 2 | 1,328 |
| 2-ethoxyethyl acetate_____ | | 370 |
| Xylene_____ | | 370 |

Procedure: Same as in Examples 1–3.

Properties:
NCO/OH _____ 1/2.5
Average molecular weight _____ 1725
Average equivalent weight _____ 287
Hydroxyl number _____ 195
Percent hydroxyl _____ 5.9

OH–3X in urethane surface coatings.—When employed as the second component together with NCO–1 or NCO–3 at the NCO/OH ratio 1.2/1.0, OH–3X gives hard urethane films which are less flexible but which have greater solvent resistance than the films of Example 2. Chemical resistance, water immersion resistance and abrasion resistance are excellent.

*Example 5*

(OH–3Y)

| Reactants | Moles | Parts |
|---|---|---|
| Polypropyleneether glycol, M.W. 420_____ | 1 | 820 |
| Diphenylmethane-4,4'-diisocyanate (MDI)____ | 2 | 1,112 |
| Addition product of 4 mols of propylene oxide to one mol of N,N,N'N'-tetrakis(2-hydroxypropyl)ethylene diamine_____ | 2 | 2,016 |
| 2-ethoxyethyl acetate_____ | | 846 |
| Xylene_____ | | 846 |

Procedure: Same as in Examples 1–3.

Properties:
    NCO/OH _____ 1/2.5
    Average molecular weight _____ 1984
    Average equivalent weight _____ 331
    Hydroxyl number _____ 169
    Percent hydroxyl _____ 5.13

OH–3Y in urethane surface coatings: When employed as the second component together with NCO–1 or NCO–3 at the NCO/OH ratio 1.2/1.0, OH–3Y gives urethane films which are more flexible but which have less solvent resistance than the films of Example 1. Chemical resistance and water immersion resistance are excellent.

*Example 6*

(OH–3Z)

| Reactants | Mols | Parts |
|---|---|---|
| Dipropylene glycol | 1 | 536 |
| TDI (80/20; 2,4/2,6) | 2 | 1,392 |
| 1,4-bis-(2-hydroxypropyl)methylpiperazine | 2 | 1,728 |
| 2-ethoxyethyl acetate | | 784 |
| Xylene | | 784 |

Procedure: Same as in Examples 1–3.

Properties:
    NCO/OH _____ 1/1.5
    Average molecular weight _____ 910
    Average equivalent weight _____ 455
    Hydroxyl number _____ 121
    Percent hydroxyl _____ 3.7

OH–3Z in urethane surface coatings: When employed as the second component together with NCO–1 or NCO–3 at the NCO/OH ratio 1.2/1.0, OH–3Z gives urethane films which are more flexible but which have less solvent resistance than the films of Example 1. Chemical resistance and water immersion resistance are excellent.

*Example 7*

(OH–3P)

| Reactants | Mols | Parts |
|---|---|---|
| Dipropylene glycol | 1 | 134 |
| TDI (80/20; 2,4/2,6) | 2 | 348 |
| Addition product of 16 mols of propylene oxide to one mol of N,N,N',N'-tetrakis(2-hydroxypropyl)ethylene diamine | 2 | 2,440 |
| 2-ethoxyethyl acetate | | 629 |
| Xylene | | 629 |

Procedure: Same as in Examples 1–3.

Properties:
    NCO/OH _____ 1/2.5
    Average molecular weight _____ 2922
    Average equivalent weight _____ 487
    Hydroxyl number _____ 96
    Percent hydroxyl _____ 2.9

OH–3P in urethane surface coatings: When employed as the second component together with NCO–1 or NCO–3 at the ratio NCO/OH=1.2/1.0, OH–3P gives urethane films which are flexible and have a good solvent resistance. The formulation has a longer pot-life time than the formulation of Example 2. Chemical resistance and water immersion resistance are good.

*Example 8*

(OH–3D)

| Reactants | Mols | Parts |
|---|---|---|
| Polypropyleneether glycol; M.W. 750 | 1 | 1,500 |
| TDI (2,4) | 2 | 696 |
| Addition product of one mol of ethylene oxide to triisopropanolamine | 2 | 940 |
| 2-ethoxyethyl acetate | | 397 |
| Xylene | | 397 |

Procedure: Same as in Examples 1–3.

Properties:
    NCO/OH _____ 1/2.0
    Average molecular weight _____ 1560
    Average equivalent weight _____ 392
    Hydroxyl number _____ 143
    Percent hydroxyl _____ 4.34

OH–3D in urethane surface coatings: When employed as the second component together with NCO–1 or NCO–3 at the NCO/OH ratio 1.2/1.0, OH–3D gives urethane films which are more flexible but which have less solvent resistance than the films of Example 1. Chemical resistance and water immersion resistance are excellent.

*Example 9*

(OH–3Q)

| Reactants | Mols | Parts |
|---|---|---|
| Dipropylene glycol | 1 | 134 |
| TDI (80/20; 2,4/2,6) | 2 | 348 |
| Addition product of 1 mol of propylene oxide and then one mol of ethylene oxide to one mol of 1,4-bis-(2-hydroxypropyl)-piperazine | 2 | 636 |
| 2-ethoxyethyl acetate | | 240 |
| Xylene | | 240 |

Procedure: Same as in Examples 1–3.

Properties:
    NCO/OH _____ 1/1.5
    Average molecular weight _____ 1118
    Average equivalent weight _____ 559
    Hydroxyl number _____ 100
    Percent hydroxyl _____ 3.04

OH–3Q in urethane surface coatings: When employed as the second component together with NCO–1 or NCO–3 at the NCO/OH ration 1.2/1.0, OH–3Q gives urethane films which are more flexible but which have less solvent resistance than the films of Example 1. Chemical resistance and water immersion resistance are excellent.

*Example 10*

(OH–3L)

| Reactants | Mols | Parts |
|---|---|---|
| Polypropyleneether glycol, M.W. 750 | 1 | 1,500 |
| TDI (80/20; 2,4/2,6) | 2 | 696 |
| N-(2-hydroxyethyl)-N,N',N'-tris-(2-hydroxypropyl) ethylene diamine | 2 | 1,112 |
| 2-ethoxyethyl acetate | | 709 |
| Xylene | | 709 |

Procedure: Same as in Examples 1–3.

Properties:
    NCO/OH _____ 1/2.5
    Average molecular weight _____ 1680
    Average equivalent weight _____ 280
    Hydroxyl number _____ 200
    Percent hydroxyl _____ 6.07

OH–3L in urethane surface coatings: When employed as the second component together with NCO–1 or NCO–3 at the NCO/OH ratio 1.2/1.0, OH–3L gives urethane films which are more flexible but which have less solvent resistance than the films of Example 1. Chemical resistance and water immersion resistance are excellent.

*Example 11*

(OH–3M)

| Reactants | Mols | Parts |
|---|---|---|
| Polypropyleneether glycol, M.W. 750 | 1 | 1,500 |
| TDI (80/20; 2,4/2,6) | 2 | 696 |
| N-(2-hydroxyethyl)-N,N-di(2-hydroxypropyl)amine | 2 | 708 |
| 2-ethoxyethyl acetate | | 363 |
| Xylene | | 363 |

Procedure: Same as in Examples 1–3.

Properties:

| | |
|---|---|
| NCO/OH | 1/2.0 |
| Average molecular weight | 1450 |
| Average equivalent weight | 362 |
| Hydroxyl number | 155 |
| Percent hydroxyl | 4.6 |

OH–3M in urethane surface coatings: When employed as the second component together with NCO–1 or NCO–3 at the NCO/OH ratio 1.2/1.0, OH–3M gives urethane films which are more flexible but which have less solvent resistance than the films of Example 1. Chemical resistance and water immersion resistance are excellent.

*Example 12*

(OH–3N)

| Reactants | Mols | Parts |
|---|---|---|
| Polypropyleneether glycol, M.W. 300 | 1 | 1,200 |
| TDI (80/20; 2, 4/2, 6) | 2 | 1,392 |
| Triisopropanolamine | 2 | 1,528 |
| 2-ethoxyethyl acetate | | 515 |
| Xylene | | 515 |

Procedure: Same as in Examples 1–3.
Properties:

| | |
|---|---|
| NCO/OH | 1/2.0 |
| Average molecular weight | 1030 |
| Average equivalent weight | 257 |
| Hydroxyl number | 218 |
| Percent hydroxyl | 6.55 |

OH–3N in urethane surface coatings: When employed as the second component together with NCO–1 or NCO–3 at the NCO/OH ratio 1.2/1.0, OH–3N gives urethane films which are less flexible but which have greater solvent resistance than the films of Example 1. Chemical resistance and water immersion resistance are excellent.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. An ordered hydroxy-terminated urethane composition produced sequentially by first mixing and reacting together about one molar proportion of polypropyleneether glycol ($a$) with about two molar proportions of arylene diisocyanate ($c$) selected from the group consisting of phenylene diisocyanate, tolylene diisocyanate, and diphenylmethane-4,4'-diisocyanate, to produce an isocyanate-terminated polypropyleneether glycol urethane, and then mixing and reacting about one molar proportion of the thus-formed isocyanate-terminated urethane with about two molar proportions of tertiary-nitrogen-containing polyol ($b$), said tertiary-nitrogen-containing polyol ($b$) being selected from the group consisting of polyols of the formulae:

(1) 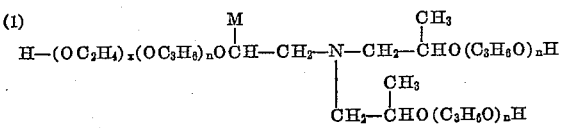

and (2) 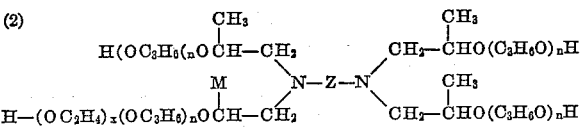

and (3) 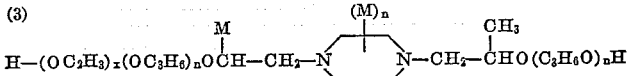

wherein Z is an alkylene radical containing from 2 through 6 carbon atoms, wherein M is selected from H and $CH_3$, wherein $n$ is a number from zero to four, inclusive, and wherein $x$ is zero to one, inclusive, to produce the desired ordered hydroxy-terminated urethane composition, the initial reaction temperature in the first step of the reaction being not greater than about sixty degrees centigrade.

2. A ordered hydroxy-terminated urethane composition according to claim 1 wherein the polypropyleneether glycol ($a$) has a molecular weight not greater than about 750 and $n$ does not exceed two.

3. An ordered hydroxy-terminated urethane composition according to claim 2, wherein the arylene diisocyanate ($c$) is tolylene diisocyanate and the tertiary-nitrogen-containing polyol ($b$) is an alkylene oxide addition product of ethylene diamine.

4. An ordered hydroxy-terminated urethane composition according to claim 2 wherein the arylene diisocyanate ($c$) is tolylene diisocyanate and the tertiary-nitrogen-containing polyol ($b$) is a triisopropanolamine alkylene oxide addition product.

5. An ordered hydroxy-terminated urethane composition according to claim 2 wherein the arylene diisocyanate ($c$) is tolylene diisocyanate and the tertiary-nitrogen-containing polyol ($b$) is a 1,4-bis-(2-hydroxypropyl)-piperazine alkylene oxide addition product.

6. An ordered hydroxy-terminated urethane composition according to claim 1 wherein the average equivalent weight is between about 200 and about 500.

7. A solution of an ordered hydroxy-terminated urethane composition according to claim 1 in a surface coating solvent which is nonreactive therewith.

8. A urethane coating composition including as one component an ordered hydroxy-terminated urethane composition according to claim 1 and including an organic polyisocyanate as a second component.

9. A coating composition according to claim 8, including an organic surface coating solvent which is nonreactive with both the components of the coating composition and their polyurethane reaction product.

10. A process for the sequential production of an ordered hydroxy-terminated urethane composition which includes the steps of first mixing and reacting together about one molar proportion of polypropylene-ether glycol ($a$) with about two molar proportions of arylene diisocyanate ($c$) selected from the group consisting of phenylene diisocyanate, tolylene diisocyanate, and diphenylmethane-4,4'-diisocyanate, to produce an isocyanate-terminated polypropyleneether glycol urethane, and then mixing and reacting about one molar proportion of the thus-formed isocyanate-terminated urethane with about two molar proportions of tertiary-nitrogen containing polyol ($b$), said tertiary-nitrogen containing polyol ($b$) being selected from the group consisting of polyols of the formulae:

(1) 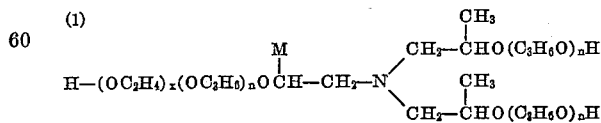

and (2) 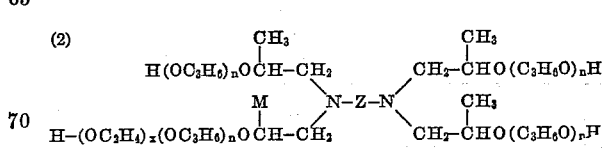

and (3)

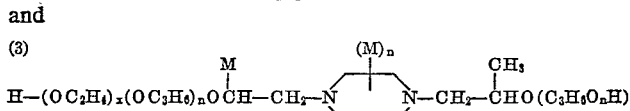

wherein Z is an alkylene radical containing from 2 through 6 carbon atoms, wherein M is selected from H and CH₃, wherein n is a number from zero to four, inclusive, and wherein x is zero to one, inclusive, to produce the desired ordered hydroxy-terminated urethane composition, the initial reaction temperature in the first step of the reaction being not greater than about sixty degrees centigrade.

11. A process for producing an ordered hydroxy-terminated urethane composition according to claim 10, wherein the polypropyleneether glycol (a) has a molecular weight not greater than about 750 and n does not exceed two.

12. A process for producing an ordered hydroxy-terminated urethane composition according to claim 11, wherein the arylene diisocyanate (c) is tolylene diisocyanate and the tertiary-nitrogen-containing polyol (b) is an alkylene oxide addition product of ethylene diamine.

13. A process for producing an ordered hydroxy-terminated urethane composition according to claim 11, wherein the arylene diisocyanate (c) is tolylene diisocyanate and the tertiary-nitrogen-containing polyol (b) is a triisopropanolamine alkylene oxide addition product.

14. A process for producing an ordered hydroxy-terminated urethane composition according to claim 11, wherein the arylene diisocyanate (c) is tolylene diisocyanate and the tertiary-nitrogen-containing polyol (b) is a 1,4-bis-(2-hydroxypropyl)-piperazine alkylene oxide addition product.

15. An ordered tertiary amine nitrogen-containing hydroxy-terminated urethane composition prepared by first mixing and reacting about one molar proportion of polypropyleneether glycol (a), having a molecular weight between about 134 and 1000, with about two molar proportions of arylene diisocyanate (c) selected from the group consisting of phenylene diisocyanate, tolylene diisocyanate, and diphenylmethane-4,4'-diisocyanate, to produce an isocyanate-terminated polypropyleneether glycol urethane (I), and then mixing and reacting about one molar proportion of the thus-formed isocyanate-terminated urethane (I) with about two molar proportions of tertiary-nitrogen-containing polyol (b) selected from the group consisting of:

(1)

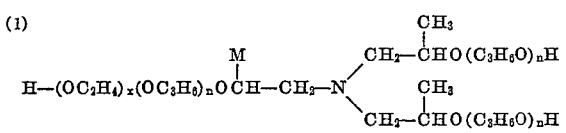

and (2)

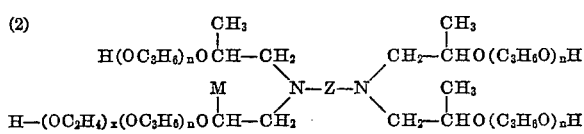

and (3)

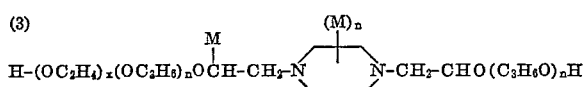

wherein Z is an alkylene radical containing from 2 through 6 carbon atoms, wherein M is selected from H and CH₃, wherein n is a number from zero to four, inclusive, and wherein x is zero to one, inclusive.

16. A process for the sequential production of an ordered tertiary amine nitrogen-containing hydroxy-terminated urethane composition which consists in first mixing and reacting about one molar proportion of polypropyleneether glycol (a), having a molecular weight between about 134 and 1000, with about two molar proportions of arylene diisocyanate (c) selected from the group consisting of phenylene diisocyanate, tolylene diisocyanate, and diphenylmethane-4,4'-diisocyanate, to produce an isocyanate-terminated polypropyleneether glycol urethane (I), and then mixing and reacting about one molar proportion of the thus formed isocyanate-terminated urethane (I) with about two molar proportions of tertiary-nitrogen-containing polyol (b), selected from the group consisting of:

(1)

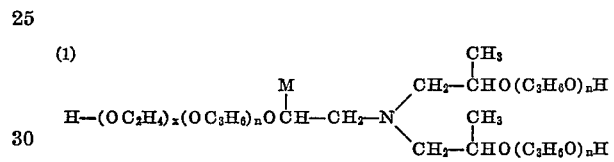

and (2)

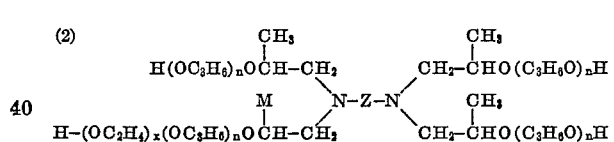

and (3)

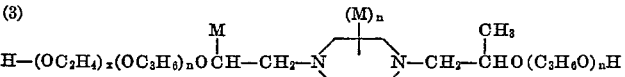

wherein Z is an alkylene radical containing from 2 through 6 carbon atoms, wherein M is selected from H and CH₃, wherein n is a number from zero to four, inclusive, and wherein x is zero to one, inclusive.

References Cited in the file of this patent
UNITED STATES PATENTS

| | | |
|---|---|---|
| 2,814,605 | Stilmar | Nov. 26, 1957 |
| 2,915,496 | Swart et al. | Dec. 1, 1959 |

FOREIGN PATENTS

| | | |
|---|---|---|
| 206,295 | Australia | Feb. 10, 1955 |

OTHER REFERENCES

Chemical and Engineering News, January 21, 1957, page 78.

E. I. du Pont de Nemours and Co., Wilmington, Del., "Continuous Preparation of Urethane Foam Prepolymer," HR–29, July 1958.

UNITED STATES PATENT OFFICE
CERTIFICATE OF CORRECTION

Patent No. 3,049,514                 August 14, 1962

Adolfas Damusis

It is hereby certified that error appears in the above numbered patent requiring correction and that the said Letters Patent should read as corrected below.

Column 4, line 61, for "have" read -- has --; column 9, Example 8, in the table, first column, line 3 thereof, for "ehtylene" read -- ethylene --; column 10, line 35, for "ration" read -- ratio --; column 11, line 67, formula (2), for "(" second occurrence, read -- ) --; same column 11, line 75, left-hand portion of formula (3), for "H-(OC$_2$H$_3$)" read -- H-(OC$_2$H$_4$) --; column 12, line 8, for "A" read -- An --; column 13, line 4, right-hand portion of formula (3), for "-CHO(C$_3$H$_6$O$_n$H)" read ---CHO(C$_3$H$_6$O)$_n$H --.

Signed and sealed this 16th day of April 1963.

(SEAL)
Attest:

ERNEST W. SWIDER
Attesting Officer

DAVID L. LADD
Commissioner of Patents